United States Patent
Keohane et al.

(10) Patent No.: US 6,864,902 B2
(45) Date of Patent: Mar. 8, 2005

(54) APPARATUS AND METHOD OF DISPLAYING BOOKMARKS BASED ON A SCHEDULER OR NETWORK CONNECTION

(75) Inventors: Susann Marie Keohane, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/961,951

(22) Filed: Sep. 24, 2001

(65) Prior Publication Data

US 2003/0058273 A1 Mar. 27, 2003

(51) Int. Cl.[7] ................................................. G09G 5/00
(52) U.S. Cl. ..................................................... 345/739
(58) Field of Search .............................. 345/738, 739, 345/745, 810, 760, 763, 764, 681

(56) References Cited

U.S. PATENT DOCUMENTS

| | | | |
|---|---|---|---|
| 6,032,162 A | * | 2/2000 | Burke ....................... 715/501.1 |
| 6,037,934 A | * | 3/2000 | Himmel et al. ............. 345/760 |
| 6,557,028 B2 | * | 4/2003 | Cragun ....................... 709/205 |

OTHER PUBLICATIONS

East, Version 1.4.1, Copyright (C) 1999.*

* cited by examiner

*Primary Examiner*—Kristine Kincaid
*Assistant Examiner*—Thanh Vu
(74) *Attorney, Agent, or Firm*—Volel Emile; Mark E. McBurney (57) ABSTRACT

A method and apparatus for listing a bookmarked Web page as being accessible if it is presently accessible and for listing it as inaccessible if it is presently inaccessible is provided. In an embodiment of the invention, the bookmarked Web page is determined to be accessible based on a scheduler. For instance, when a user is bookmarking the Web page, the user may specify what day and time of day the bookmarked Web page is to be listed as being accessible. In another embodiment, the bookmarked Web page is determined to be accessible or inaccessible based on IP addresses. That is, the IP address of the computer system on which the bookmark folder resides is compared with the IP address of the computer system hosting the bookmarked Web page to determine whether they are part of the same network. If it is determined that they are part of the same network, the bookmarked Web page is determined to be presently accessible. Otherwise, it is determined to be inaccessible.

27 Claims, 5 Drawing Sheets

APPARATUS AND METHOD OF DISPLAYING BOOKMARKS BASED ON A SCHEDULER OR NETWORK CONNECTION

CROSS-REFERENCE TO RELATED APPLICATIONS

This application is related to co-pending U.S. patent application Ser. No. 09/965,004, entitled APPARATUS AND METHOD FOR A WEB BROWSER TO SELECT A HOME PAGE UPON ACTIVATION BASED ON A SCHEDULER OR NETWORK CONNECTION by the inventors herein, Filed on Sep. 27, 2001 and assigned to the common assignee of this application.

BACKGROUND OF THE INVENTION

1. Technical Field

The present invention is directed to a method and apparatus for managing bookmark folders. More specifically, the present invention is directed to an apparatus and method of listing bookmarks in a folder based on a scheduler or network connection.

2. Description of Related Art

As is well known by now, the World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse. Thus, a link is a very useful Internet navigational tool.

Another useful Internet navigational tool is a bookmark. A bookmark is a feature that is available in most Web browsers that allows a user to store Web addresses or URLs (abbreviation for Uniform Resource locators) of Web pages, that are to be later re-visited, into a folder (i.e., a bookmark folder). (A Web browser is a software application that is used to locate Web sites and display Web pages.) Patent number 6,037,944 issued to Himmel et al. and entitled NAMED BOOKMARK SETS as well as patent number 6,208,995 B1 issued to the same inventors and entitled WEB BROWSER DOWNLOAD OF BOOKMARK SET describe how a bookmark is downloaded into a bookmark folder. The description in both patents is herein incorporated.

Thus, when a user accesses a Web Page that may later be re-visited, the user may bookmark the page. However, sometimes some bookmarked Web pages may not be readily accessible. For instance, as a security measure against Internet intruders, most companies erect firewalls. A firewall allows computer systems that make part of a company's Intranet to freely communicate with each other. These computer systems are euphemistically referred to as being behind the company's firewall. A computer system that is not behind a company's firewall may not freely communicate with computer systems behind the firewall.

When an employee or user uses a computer system (such as a laptop) behind the company's firewall, the employee is able to access and bookmark Web pages located on computer systems that are behind the firewall. When the employee uses the computer system outside of the company's firewall, the employee may not be able to access bookmarked Web pages located on computer systems within the company's Intranet.

Presently, when an employee or user accesses a bookmark folder, whether the bookmarked Web pages stored therein are presently accessible or not, they are all listed as being presently accessible. Consequently, the user may unwittingly try to access a presently inaccessible Web page.

Hence, what is needed is a method and apparatus to alert a user as to whether a bookmarked Web page is presently accessible.

SUMMARY OF THE INVENTION

The present invention provides a method and apparatus for listing a bookmarked Web page as being accessible if it is presently accessible and for listing it as inaccessible if it is presently inaccessible. In an embodiment of the invention, the bookmarked Web page is determined to be accessible based on a scheduler. For instance, when a user is bookmarking the Web page, the user may specify what day and time of day the bookmarked Web page is to be listed as being accessible. If the time when the user is accessing the bookmark folder falls outside of the time entered, the bookmarked Web page will be listed as being inaccessible.

In another embodiment of the invention, the bookmarked Web page is determined to be accessible or inaccessible based on IP addresses. That is, the IP address of the computer system on which the bookmark folder resides is compared with the IP address of the computer hosting the bookmarked Web page to determine whether they are both part of the same network. If it is determined that the two addresses are within the same network, the bookmarked Web page is determined to be presently accessible. Otherwise, it is determined to be presently inaccessible.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
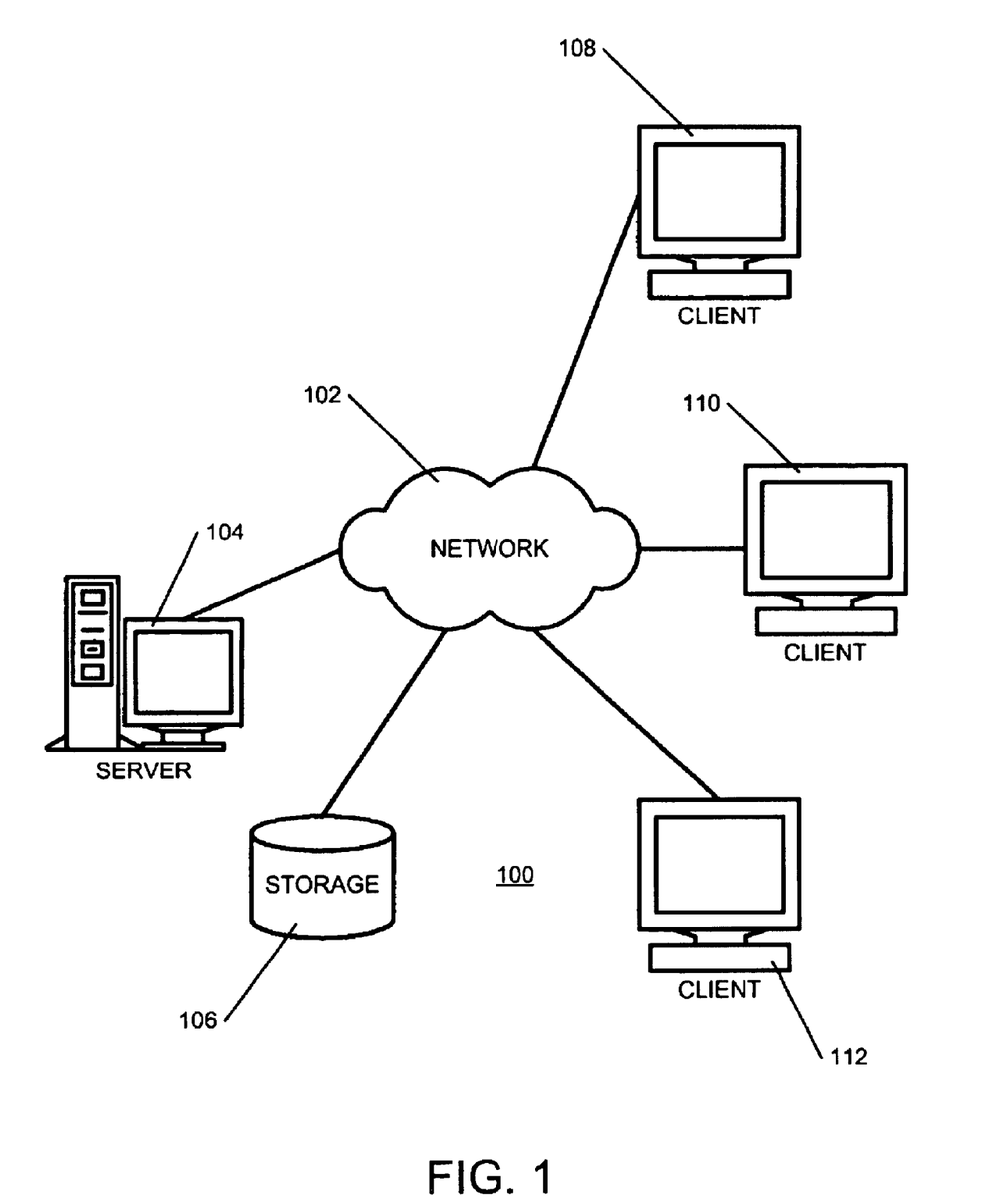
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
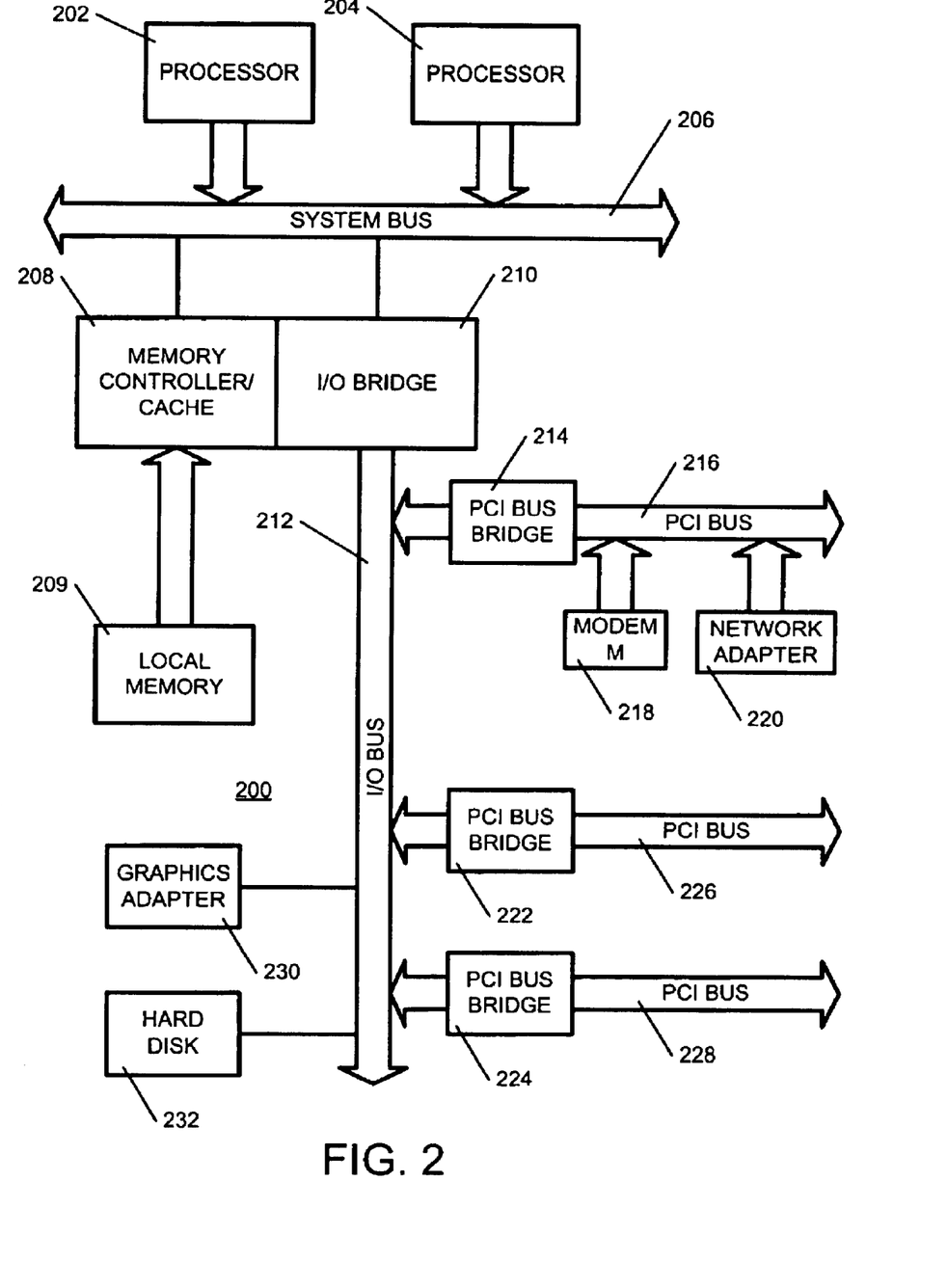
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
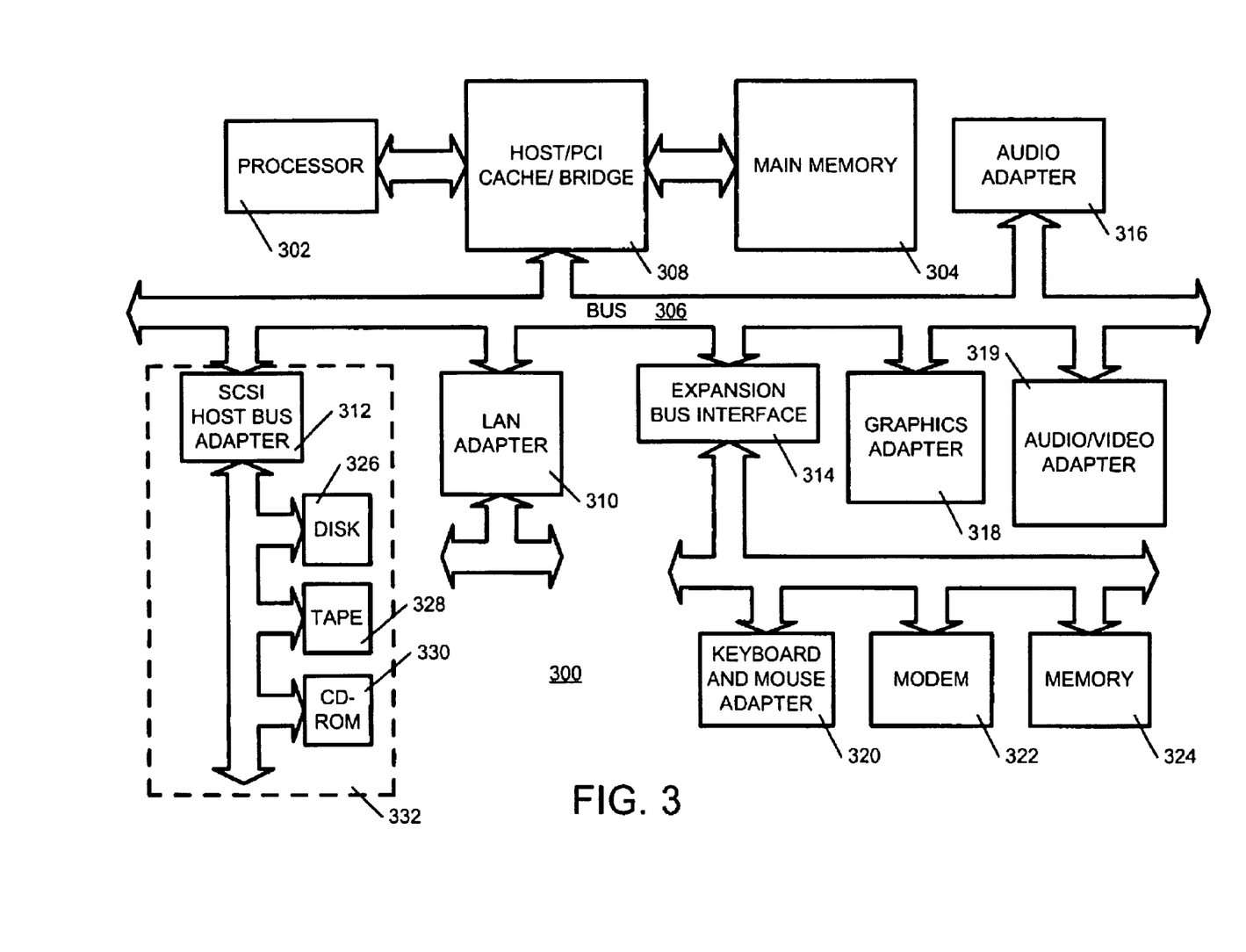
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method that notify users of which of different bookmarks in a bookmark folder are presently accessible. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

As mentioned earlier, in some instances some bookmarked Web pages may not be readily accessible. The invention uses two methods to identify bookmarked Web pages that are accessible as oppose to those that are not accessible. In either one of the two methods, when the bookmark folder is accessed, through the pull-down menu for instance, the bookmarked Web pages or URLs that are not accessible may not be part of the displayed list of bookmarked Web pages that is usually ensued. Alternatively, the inaccessible bookmarked Web pages may be grayed out in the ensuing list to notify the user that they are not accessible at the moment. Note that, although the invention uses two methods to list as well as to distinguish between presently accessible Web pages from presently inaccessible ones, the invention is not restricted to only these methods, any other method that may be used to list or to distinguish between presently accessible from presently inaccessible bookmarked Web pages is perfectly within the scope of the invention.

The first method is based on a scheduler. For example, the user or employee, while bookmarking a Web page may enter when the bookmark can be accessed. That is, if the computer system on which the Web page is located is behind the firewall of the employer of the user, the user may specify that the bookmarked Web page is only accessible between Monday and Friday, from eight (8) in the morning to five (5) in the afternoon. Bookmarked Web pages that fall into that category will not be part of the list of bookmarked Web pages or may be grayed out when the bookmark folder is accessed at times other than those specified.

Alternatively, depending on the network connection or the IP (Internet Protocol) address of the computer system the user is currently using, the invention may automatically determine which bookmarked Web pages may currently be accessible. An IP address is an identifier for a computer system or device on a TCP/IP (Transmission Control Protocol/Internet Protocol) network. TCP/IP is a suite of protocols used to connect computer systems on the Internet. Networks using the TCP/IP protocol route messages based on the IP address of the destination system. Thus, each computer system on the Internet has a unique IP address.

The IP address consists of four numbers separated each by a period. Each number may be between zero (0) and 255. For example, 1.160.10.240 may be an IP address. The four numbers are used to identify a particular network and a specific computer system on that network. Thus, each company which has a network (i.e., an Intranet) is assigned a number identifying the network.

Thus, the invention may be designed or the user may specify ahead of time that if the destination computer system (i.e., the computer system that hosts the bookmarked Web page) is behind a company's firewall (i.e., is part of a company's Intranet) not to display or to gray out the bookmarked Web pages unless the computer system containing the bookmark folder is also within the company's Intranet. To do so the user, while bookmarking a Web page, may indicate that the computer system hosting the Web page being bookmarked is behind a firewall. When so indicated, the IP address of the host computer system is stored and associated with the bookmarked Web page.

To distinguish a presently accessible bookmarked Web page from a presently inaccessible one, the computer system that the user is employing needs only compare its IP address with a stored IP address to determine whether they are both on the same network. If the two IP addresses are within the same network, the bookmarked Web page may be indicated as being presently accessible otherwise it may be indicated as being presently inaccessible.

If the computer system in use by the user does not know its IP address or if it does not know the IP address of the computer system hosting the bookmarked Web page, it can simply use the reverse address resolution protocol (RARP) to find out its own address or request the IP address from the hosting computer. ARP (address resolution protocol) is the protocol used by TCP/IP to convert a physical address into an IP address. A computer system wishing to find out an IP address of another computer system broadcasts an ARP request onto the network or Internet. A computer system on the network that has the IP address responds with its physical address. RARP, on the other hand, is used to obtain a computer system's own IP address. A computer system wishing to find out its own IP address broadcasts its own physical address on the network and the RARP server (the server that assigns IP address to the computer systems in the network) will reply with the computer system's IP address. In the case where the computer system knows the physical address of the hosting computer system (i.e., when knowing the URL of a bookmarked Web page), the computer system may easily request that the hosting computer system provide its IP address. Thus, both IP addresses will be available to the computer system in use by the user.

It is important to note that in either one of the two methods described above, graying out does not mean that the user will not be able to click on the bookmarked Web page to access the page. It simply means that the user will be able to distinguish presently accessible bookmarked Web pages from presently inaccessible ones. Thus, if the user clicks on a bookmarked Web page that is indeed presently inaccessible, the user will not be able to access the Web page and the usual error "page cannot be displayed" may ensue.

Figure 4:
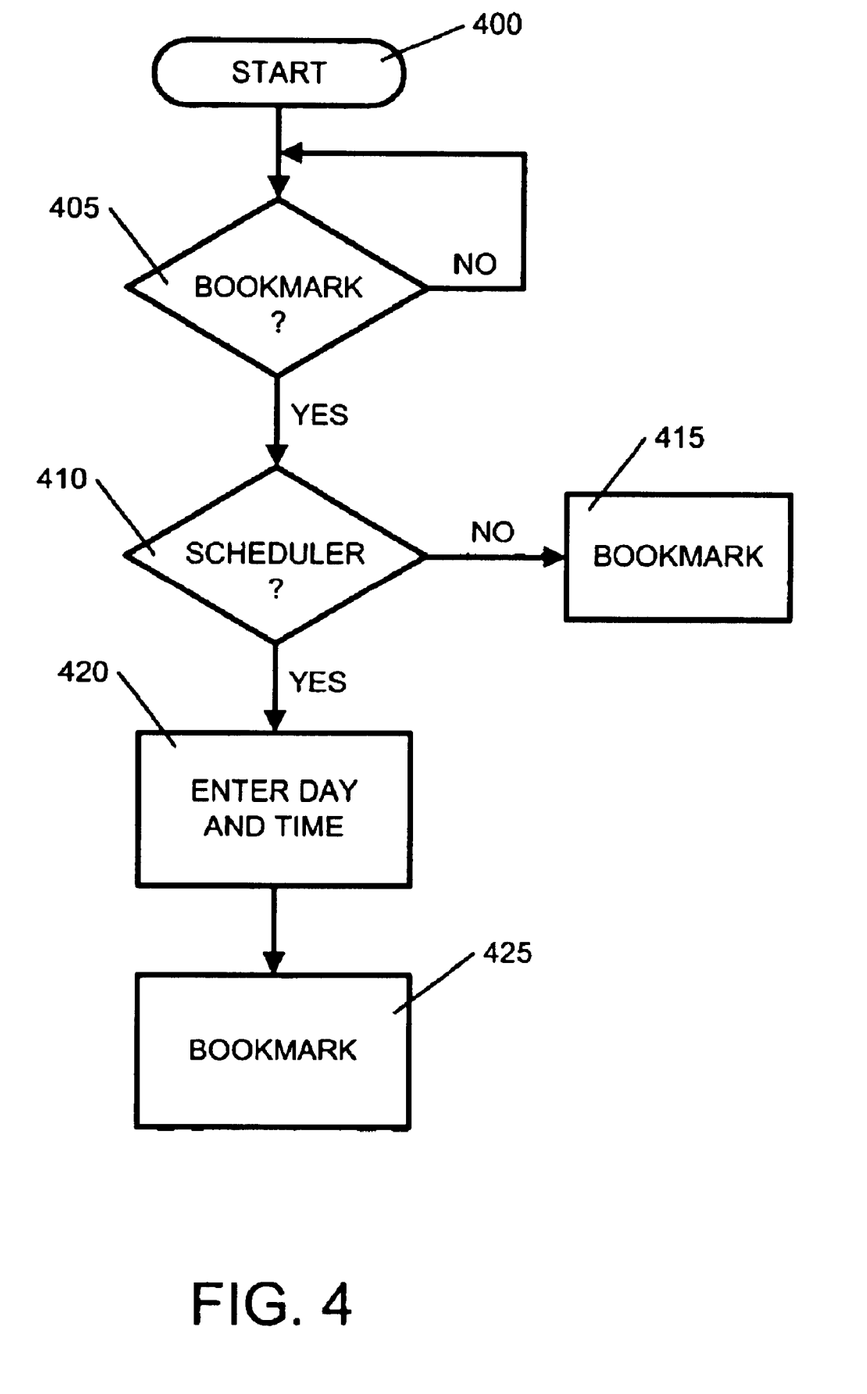
FIG. 4 is a flow diagram of the invention using a scheduler.

FIG. 4 is a flow diagram of the invention using the scheduler method. When the bookmark folder is accessed through the pull-down menu, the process starts (step 400). If the user wants to bookmark a Web page, the user is prompted to enter a time period within which the bookmarked Web page is to be listed as being accessible. If the user does not want to specify when the bookmarked web page is to be listed as being accessible, then the Web page is simply bookmarked (steps 405, 410 and 415). Otherwise, the user needs to enter day or days and time of day that the bookmarked Web page should be listed as being accessible (steps 405, 410, 420 and 425). The schedule entered by the user will be stored and associated with the bookmarked Web page. The next time the bookmark folder is accessed, the computer system will check the present day and time of day (all computer system has a clock and a calendar) to determine whether to list the bookmarked Web page as being accessible.

Figure 5:
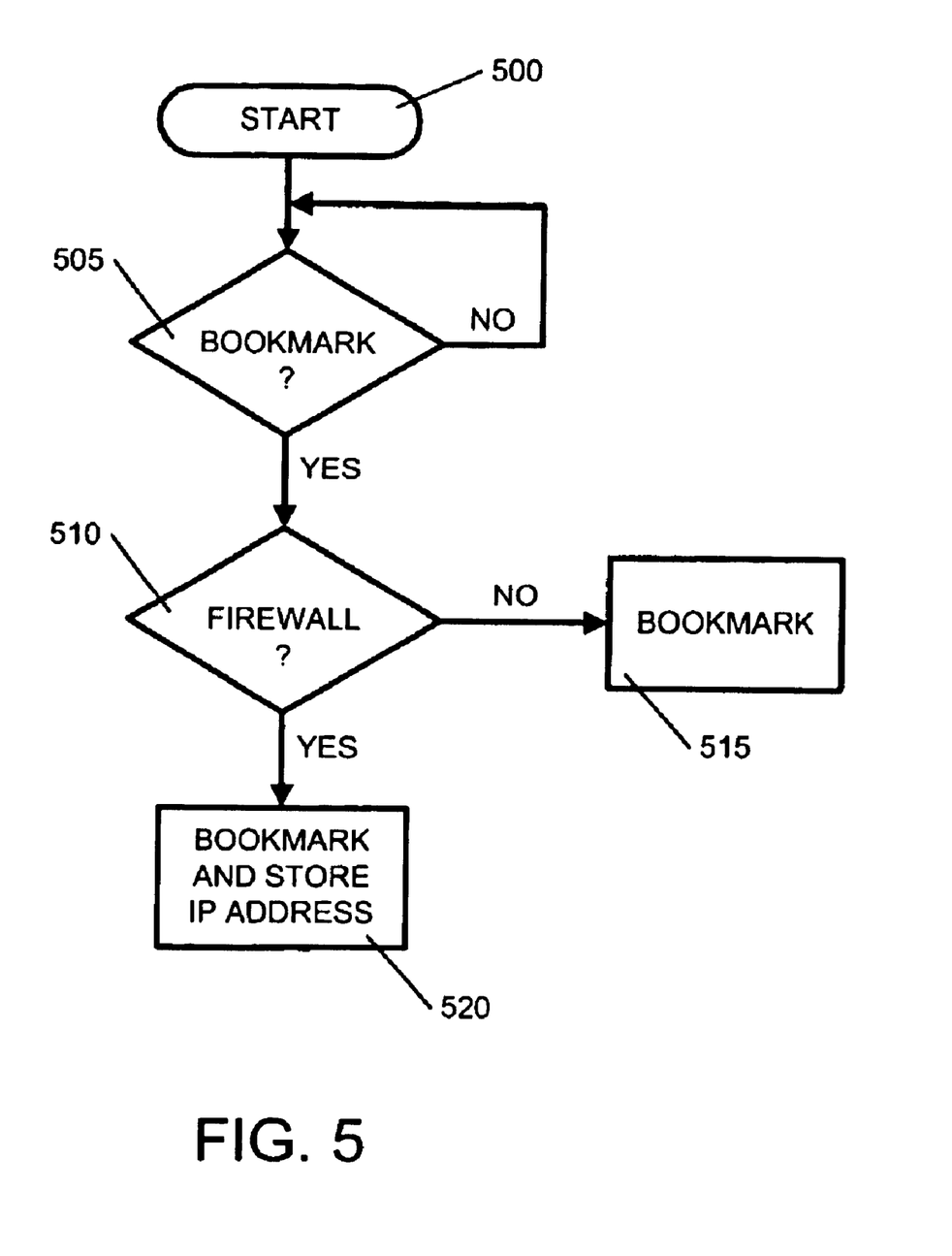
FIG. 5 is a flow diagram of the invention using IP addresses to determine when to display bookmarked Web pages as being accessible.

FIG. 5 is a flow diagram of the invention using the IP address to determine when to display bookmarked Web pages as being accessible. Again the process starts as soon as the bookmark folder is accessed (step 500). If the user decides to bookmark a Web page then the user will be prompted as to whether the hosting computer is behind a firewall, if the user checks yes, then the IP address of the hosting computer is also stored (steps 505, 510 and 520). If the user checks no or ignores the prompt, the Web page is simply bookmarked (steps 505, 510 and 515). Then, whenever the bookmark folder is accessed the IP address of the computer system in use by the user is compared with each stored IP address to determine whether they are within the same network (i.e., Intranet). If so, the bookmarked Web page associated with the IP address will be displayed as being presently accessible. Otherwise, it will be displayed as being presently inaccessible.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of listing bookmarked Web pages in a bookmark folder comprising the steps of:
    determining, using a scheduler, whether each bookmarked Web page in said folder is presently accessible or inaccessible; and
    listing each bookmarked Web page in said folder as being inaccessible if it is not presently accessible and accessible if it is presently accessible.

2. The method of claim 1 wherein said step of listing includes the step of not listing said bookmarked Web page if it is presently inaccessible.

3. The method of claim 2 wherein said step of determining includes comparing IP address of a computer system on which the folder is stored with IP address of a computer system hosting said Web page to determine whether the two computer systems are within the same network.

4. The method of claim 3 wherein if the two computer systems are within the same network the bookmarked Web page is determined to be presently accessible and if they are not within the same network the bookmarked Web page is determined to be presently inaccessible.

5. The method of claim 1 wherein said step of listing includes the step of listing said bookmarked Web page in a grayed out fashion if it is presently inaccessible.

6. The method of claim 5 wherein said step of determining includes comparing IP address of a computer system on which the folder is stored with IP address of a computer system hosting said Web page to determine whether the two computer systems are within the same network.

7. The method of claim 6 wherein if the two computer systems are within the same network the bookmarked Web page is determined to be presently accessible and if they are not within the same network the bookmarked Web page is determined to be presently inaccessible.

8. A computer program product in a computer readable medium for listing bookmarked Web pages in a bookmark folder comprising:
    code means, using a scheduler, for determining whether each bookmarked Web page in said folder is presently accessible or inaccessible; and
    code means for listing each bookmarked Web page in said folder as being inaccessible if it is not presently accessible and accessible if it is presently accessible.

9. The computer program product of claim 8 wherein said listing code means includes code means for not listing said bookmarked Web page if it is inaccessible.

10. The computer program product of claim 9 wherein said determining code means includes code means for comparing IP address of a computer system on which the folder is stored with IP address of a computer system hosting said Web page to determine whether the two computer systems are within the same network.

11. The method of claim 10 wherein if the two computer systems are within the same network the bookmarked Web page is determined to be presently accessible and if they are not within the same network the bookmarked Web page is determined to be presently inaccessible.

12. The computer program product of claim 8 wherein said listing code means includes code means for listing said bookmarked Web page in a grayed out fashion if it is inaccessible.

13. The computer program product of claim 12 wherein said code means for determining includes code means for comparing IP address of a computer system on which the folder is stored with IP address of a computer system hosting said Web page to determine whether the two computer systems are within the same network.

14. The computer program product of claim 13 wherein if the two computer systems are within the same network the bookmarked Web page is determined to be presently accessible and if they are not within the same network the bookmarked Web page is determined to be presently inaccessible.

15. An apparatus for listing bookmarked Web pages in a bookmark folder comprising:
    means, using a scheduler, for determining whether each bookmarked Web page in said folder is presently accessible or inaccessible; and
    means for listing each bookmarked Web page in said folder as being inaccessible if it is not presently accessible and accessible if it is presently accessible.

16. The apparatus of claim 15 wherein said listing means includes means for not listing said bookmarked Web page if it is inaccessible.

17. The apparatus of claim 16 wherein said determining means includes means for comparing IP address of a computer system on which the folder is stored with IP address of a computer system hosting said Web page to determine whether the two computer systems are within the same network.

18. The apparatus of claim 17 wherein if the two computer systems are within the same network the bookmarked Web page is determined to be presently accessible and if they are not within the same network the bookmarked Web page is determined to be presently inaccessible.

19. The apparatus of claim 15 wherein said listing means includes means for listing said bookmarked Web page in a grayed out fashion if it is inaccessible.

20. The apparatus of claim 19 wherein said determining means includes means for comparing IP address of a computer system on which the folder is stored with IP address of a computer system hosting said Web page to determine whether the two computer systems are within the same network.

21. The apparatus of claim 20 wherein if the two computer systems are within the same network the bookmarked Web page is determined to be presently accessible and if they are not within the same network the bookmarked Web page is determined to be presently inaccessible.

22. A system for bookmarking Web pages in a bookmark folder comprising:
    at least one storage device for storing code data; and
    at least one processor for processing the code data to determine, using a scheduler, whether each bookmarked Web page in the folder is presently accessible or inaccessible, and to list each bookmarked Web page in the folder as being inaccessible if it is not presently accessible and accessible if it is presently accessible.

23. A system for bookmarking Web pages in a bookmark folder comprising:
   at least one storage device for storing code data; and
   at least one processor for processing the code data to determine, by comparing IP address of the system with IP address of each computer system hosting a bookmarked Web page, whether the bookmarked Web page in the folder is presently accessible or inaccessible, and to list each bookmarked Web page in the folder as being inaccessible if it is not presently accessible and accessible if it is presently accessible.

24. A method of listing bookmarked Web pages in a bookmark folder comprising the steps of:
   determining whether a computer system on which the bookmark folder is located is behind a company's firewall;
   determining whether each computer system hosting a bookmarked Web page is also behind the company's firewall; and
   listing each bookmarked Web page in the folder that is hosted by a computer system that is behind the company's firewall as being inaccessible if the computer system on which the folder is located is not behind the company's firewall and accessible otherwise.

25. A computer program product on a computer readable medium for listing bookmarked Web pages in a bookmark folder comprising:
   code means for determining whether a computer system on which the bookmark folder is located is behind a company's firewall;
   code means for determining whether each computer system hosting a bookmarked Web page is also behind the company's firewall; and
   code means for listing each bookmarked Web page in the folder that is hosted by a computer system that is behind the company's firewall as being inaccessible if the computer system on which the folder is located is not behind the company's firewall and accessible otherwise.

26. An apparatus for listing bookmarked Web pages in a bookmark folder comprising:
   means for determining whether a computer system on which the bookmark folder is located is behind a company's firewall;
   means for determining whether each computer system hosting a bookmarked Web page is also behind the company's firewall; and
   means for listing each bookmarked Web page in the folder that is hosted by a computer system that is behind the company's firewall as being inaccessible if the computer system on which the folder is located is not behind the company's firewall and accessible otherwise.

27. A system for listing bookmarked Web pages in a bookmark folder comprising:
   at least one storage system for storing code data; and
   at least one processor for processing the code data to determine whether a computer system on which the bookmark folder is located is behind a company's firewall, to determine whether each computer system hosting a bookmarked Web page is also behind the company's firewall, and to list each bookmarked Web page in the folder that is hosted by a computer system that is behind the company's firewall as being inaccessible if the computer system on which the folder is located is not behind the company's firewall and accessible otherwise.

* * * * *